United States Patent
Close Jr.

[15] 3,696,800
[45] Oct. 10, 1972

[54] BARBECUE GRILL

[72] Inventor: Arthur L. Close Jr., 4859 Oak Knoll Drive, Youngstown, Ohio 44512

[22] Filed: Aug. 21, 1970

[21] Appl. No.: 65,846

[52] U.S. Cl. ............................................126/25 A
[51] Int. Cl. .........................A47j 37/00, F24b 3/00
[58] Field of Search........126/9, 25, 25 A, 25 B, 25 C, 126/29, 30

[56] References Cited

UNITED STATES PATENTS

| 2,950,712 | 8/1960 | Terry | 126/25 A |
| 2,960,979 | 11/1960 | Stone | 126/25 A |
| 3,245,398 | 4/1966 | Baker | 126/25 X |
| 3,316,892 | 5/1967 | Hanke | 126/25 |

FOREIGN PATENTS OR APPLICATIONS 659,147   3/1963   Canada......................126/25

Primary Examiner—Charles J. Myhre
Attorney—Webster B. Harpman

[57] ABSTRACT

A barbecue grill having a bowl with a relatively flat bottom is provided with a pair of superimposed vertically movable grates normally positioned in spaced relation and above the bottom of the bowl. Telescopically arranged members support the grates and individual operating arms are arranged to impart movement to the telescopically arranged members so as to move the grates relative to one another and to the bowl.

4 Claims, 3 Drawing Figures

PATENTED OCT 10 1972
3,696,800
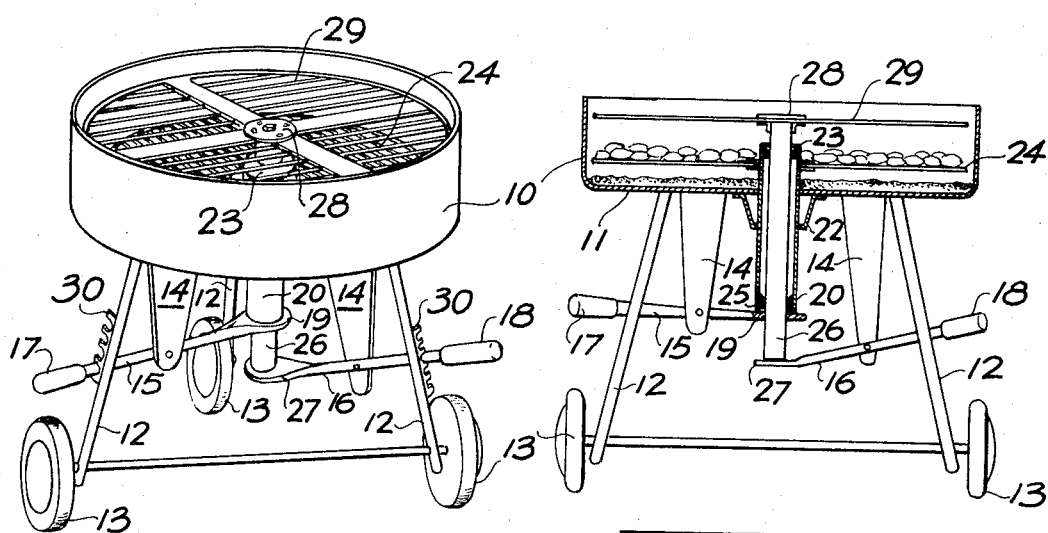
FIG-1
FIG-2
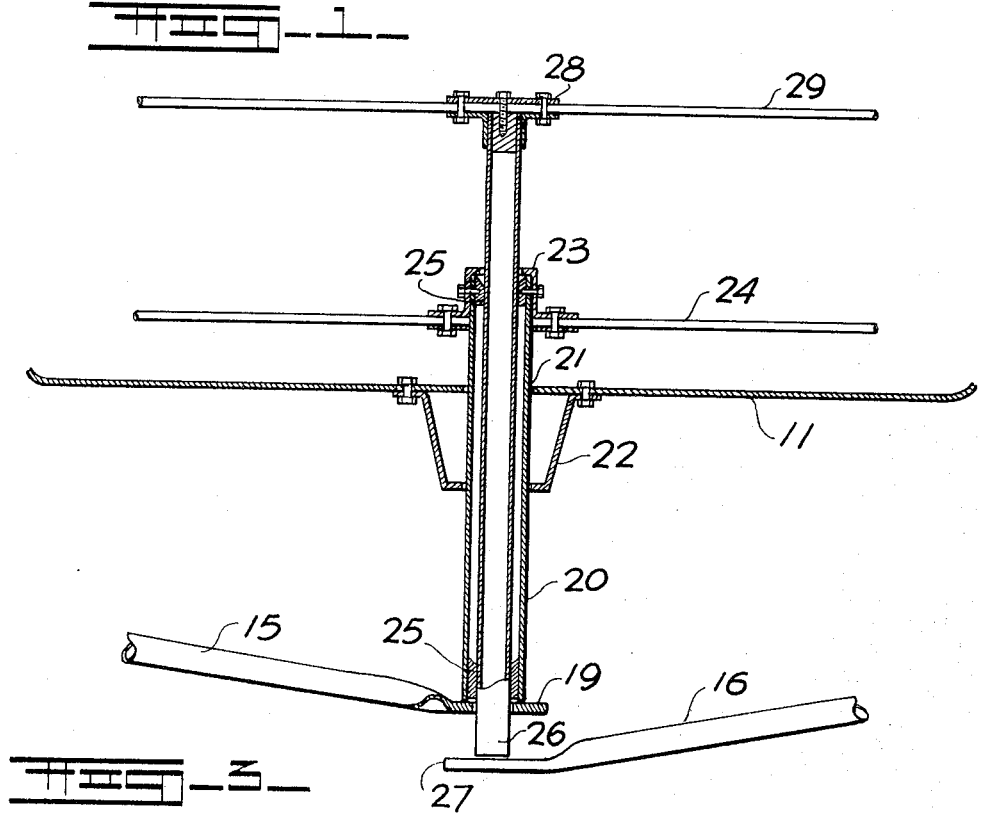
FIG-3
INVENTOR.
Arthur L. Close, Jr.
BY
W. B. Harpman

BARBECUE GRILL

BACKGROUND OF THE INVENTION

1. Field of the Invention

This invention relates to barbecue grills of the type normally employed in outdoor cooking and wherein charcoal is used as a fuel.

2. Description of the Prior Art

Prior structures of this type usually employ some kind of adjustable grate positioned in spaced relation with respect to a bowl or other container in which a charcoal fire or the like may be kindled (see U.S. Pat. Nos. 3,398,733; 3,489,132; 3,217,634 and 3,459,171).

This invention arranges two grates for vertical movement with respect to one another and the bottom of the bowl and facilitates starting a fire in the barbecue grill and adjusting the positions of the grates, one of which carries the fire, and one of which carries the food being barbecued.

SUMMARY OF THE INVENTION

A barbecue grill comprising a bowl having a relative flat bottom and means supporting the same in elevated relation to a supporting surface is provided with a pair of vertically movable grates each of which is independently supported on one of a pair of telescopically arranged support members which extend upwardly through the bowl of the barbecue grill. Levers are provided for moving the telescopically arranged support members vertically. Charcoal placed on the lower one of the two grates may be ignited by lighter fluid poured on the ashes in the bottom of the bowl as from a previous fire and when burning, the charcoal may be moved vertically toward and away from the bottom of the bowl and any ashes thereon to control combustion. The upper one of the two grates carries the food being barbecued and it, in turn, is movable toward and away from the grate carrying the burning charcoal.

DESCRIPTION OF THE DRAWINGS

FIG. 1 is a perspective elevation of the barbecue grill.

FIG. 2 is a vertical section through the barbecue grill of FIG. 1.

FIG. 3 is an enlarged detailed cross sectional elevation of portions of the barbecue grill seen in FIGS. 1 and 2.

DESCRIPTION OF THE PREFERRED EMBODIMENT

In its preferred form the barbecue grill of this invention is comprised of a bowl 10 having a relatively flat bottom 11 which is carried on the upper ends of a plurality of legs 12, the lower ends of which may be provided with wheels 13 so as to render the barbecue grill readily portable. Brackets 14 depend from the bottom 11 of the bowl 10 and lever arms 15 and 16 are respectively pivoted to the lower ends of the brackets 14. The lever arms 15 are provided with handles 17 and 18 respectively so that they can be conveniently moved thereby.

The inner end of the lever arm 15 is enlarged as at 19 and apertured. The enlarged portion 19 about the aperture engages the lower end of a first tubular support member 20 which rests on the enlarged end 19 of the arm 15 and extends vertically thereabove and through a central opening 21 in the bottom 11 of the bowl. An annular guide member 22 is attached to the lower surface of the bottom 11 of the bowl 10 and depends therefrom and slidably engages the first tubular support member 20 so as to retain the same in vertical position. The upper end of the first tubular support member 20 has an annular flanged bracket 23 attached thereto, the flange portion of which is horizontal and engaged on a first grate 24 about a central opening therein. A pair of annular spacing members 25 are positioned in the upper and lower ends of the first tubular support member 20 and space the same with respect to a second tubular member 26.

The secondary tubular support member 26 rests on an inner enlarged end 27 of the lever arm 16 and extends vertically and telescopically through the first tubular support member 20 and out of the uppermost end thereof as defined by the annular bracket 23.

A second annular bracket 28 is carried on the uppermost end of the second tubular support member 26 and, in turn, supports a secondary grate 29.

In FIG. 1 of the drawings, notched brackets 30 will be seen affixed to two of the legs 12 of the barbecue grill in closely spaced relation to the lever arms 15 and 16 so that the same may be positioned in the notched brackets 30 and the grates 24 and 29 thus held in adjusted position.

From the foregoing it will be seen that a novel barbecue grill structure has been disclosed wherein the bottom 11 of the bowl 10 of the grill will receive and retain ashes from burning charcoal positioned on the first grate 24 and that the first grate 24 is movable vertically toward and away from the bottom 11. Thus, charcoal positioned on the first grate 24 may be readily ignited by placing lighter fluid on ashes in the bowl 10 and once ignited the rate of combustion may be controlled by moving the first grate vertically toward and away from said bottom 11.

Food to be barbecued may be positioned on the second grate 29 which is normally spaced with respect to the grate 24 and movable relative thereto. Thus, 2° of adjustment are provided to insure proper cooking temperatures on the second grate 29. The above described structure provides relatively easy and fast height adjustment of the grates relative to the bowl of the barbecue grill and relative to one another.

Although but one embodiment of the present invention has been illustrated and described it will be apparent to those skilled in the art that various changes and modifications may be made therein without departing from the spirit of the invention.

I claim:

1. A barbecue grill having a body member including a relatively flat bottom and a supporting leg structure therefore, a pair of vertical telescopically arranged support members positioned through a common opening in the bottom of said body member and extending thereabove, a pair of grates, one affixed to each of the upper ends of the said pair of telescopically arranged support members and movable vertically thereby, means beneath said body member engaging each of said telescopically arranged support members for imparting individual vertical motion thereto.

2. The barbecue grill of claim 1 wherein said means for moving said vertical telescopically arranged support members includes brackets depending from said body member, lever arms pivoted between their ends to said brackets with the inner ends of said lever arms engaging the lower ends respectively of said telescopically arranged support members, one of said lower ends of said lever arms being apertured and one of said support members extending through said aperture.

3. The barbecue grill of claim 1 wherein guide means on said body member slidably engages said vertical telescopically arranged support members so as to maintain the same in vertical position.

4. The barbecue grill of claim 1 wherein said vertical telescopically arranged support members consist of a pair of tubular members of different lengths and diameters, secondary guide means disposed between said members adjacent the ends of the outer one of said members.

* * * * *